Figure 1:
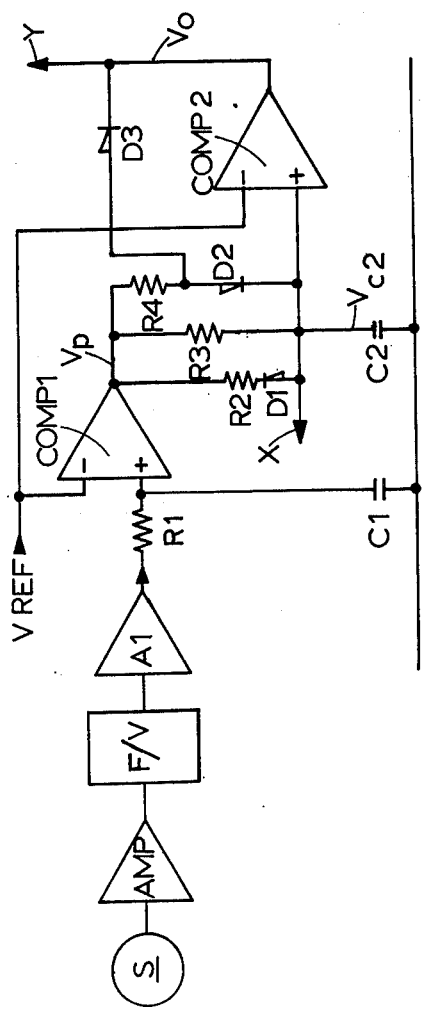

United States Patent [19]

White et al.

[11] 4,269,454
[45] May 26, 1981

[54] ANTI-SKID BRAKE CONTROL SYSTEM

[75] Inventors: Alfred K. White, Birmingham; Malcolm Brearley, Solihull, both of England

[73] Assignee: Girling Limited, Birmingham, England

[21] Appl. No.: 932,306

[22] Filed: Aug. 9, 1978

[30] Foreign Application Priority Data

Aug. 10, 1977 [GB] United Kingdom ............. 33456/77

[51] Int. Cl.³ ............................................. B60T 8/08
[52] U.S. Cl. ...................................... 303/97; 303/106
[58] Field of Search .................. 303/96, 97, 105, 106, 303/107, 109, 110

[56] References Cited
U.S. PATENT DOCUMENTS

| 3,640,588 | 2/1972 | Carp | 303/106 |
| 3,833,268 | 9/1974 | Fleagle | 303/106 |
| 4,078,845 | 3/1978 | Amberg et al. | 303/106 X |

Primary Examiner—Trygve M. Blix
Assistant Examiner—Reinhard J. Eisenzopf

Attorney, Agent, or Firm—Scrivener, Clarke, Scrivener and Johnson

[57] ABSTRACT

An anti-skid brake conrol system includes a sensor which produces a signal proportional to the acceleration of a braked wheel and a comparator that responds to the acceleration signal by producing a signal which undergoes a step change at set acceleration levels so as to divide successive deceleration/acceleration cycles into successive acceleration periods separated by intermediate periods. The output of the comparator is integrated to produce an output signal which changes in a progressive manner in one sense during each acceleration period and in the opposite sense during each intermediate period so as to vary in accordance with surface friction conditions. The output signal is used to vary a control parameter or function within the system in accordance with the surface friction conditions. The integrator may comprise a capacitor which is discharged so that its potential falls during each acceleration period from an initial predetermined level and is then charged during each intermediate period so that its potential rises, the charging rate being increased at a predetermined threshold potential below which low friction conditions are signalled.

11 Claims, 4 Drawing Figures

ANTI-SKID BRAKE CONTROL SYSTEM

SPECIFIC DESCRIPTION

This invention relates to vehicle anti-skid brake control systems which prevent or minimize wheel lock-up by sensing incipient lock-up and then releasing brake pressure until the wheel recovers in speed, whereupon brake pressure is re-applied and the skid cycle repeated at often as necessary.

In most anti-skid brake control systems, the parameter settings within the system are generally a compromise between achieving the best stopping distance on a high $\mu$ surface and retaining an adequate low $\mu$ surface control capability.

The present invention is based on an appreciation that it is preferable to modify certain parameter settings to improve the system action once skid control cycling is taking place and a clear indication of surface $\mu$ level has been inferred from wheel response characteristics. In this manner it is possible to increase the efficiency of adhesion utilization or to widen the range of surface $\mu$ on which the system can maintain adequate control or both.

According to the invention, the wheel response characteristic used to infer surface $\mu$ is the duration of wheel recovery acceleration. In particular, the invention consists in providing sensor means that produces a signal proportional to the acceleration of a braked wheel, switch means that responds to said acceleration signal by producing trigger signals at set acceleration levels so as to divide successive skid cycles into successive acceleration periods separated by intermediate periods, integrating means that is responsive to said trigger signals so as to produce an output signal that changes in a predetermined progressive manner in one sense during each acceleration period and in the opposite sense during each intermediate period so as to vary in accordance with surface friction conditions, and output connection means whereby said output signal is used to vary a control parameter or function within the system so that it is set in accordance with said surface friction conditions.

Although the terms acceleration levels and acceleration period have been used above, these should be understood to include the possibility of small deceleration levels and the periods in which they occur.

It will be appreciated that on low $\mu$ surfaces, the acceleration period will be long and the intermediate period short, whilst on high $\mu$ surfaces the acceleration period will be short and the intermediate period long, these characteristics being reflected in said output signal.

In fact, the duration of the acceleration period may give an indication of surface $\mu$ that is distorted to some extent by vehicle parameters such as axle inertia, brake hysteresis and transmission and brake drag, but it is found that the distortion is acceptable because it tends to indicate a lower surface $\mu$ than actually exists.

In a preferred embodiment, the integrating means comprises a capacitor that is discharged during each acceleration period and is charged during each intermediate period, the time constant of the capacitor being substantially longer than the period of the deceleration/acceleration cycles on high and medium $\mu$ surfaces, but possibly being shorter than the period of the deceleration/acceleration cycles on very low $\mu$ surfaces. The voltage on the capacitor is used to give an indication of surface $\mu$, the voltage either being used for proportional control of a system control parameter or for triggering a control parameter or function at a preset level.

The duration of the acceleration period is better than the amplitude of the acceleration signal in indicating a wide range of surface conditions, since on some high $\mu$ surfaces there is no acceleration period if the vehicle deceleration is high and this would be misinterpreted by an amplitude responsive system. Also, because the acceleration period is used to indicate surface $\mu$, the detection process itself can be adapted according to surface $\mu$ so as to give improved noise rejection on low $\mu$ surfaces.

Figure 2:
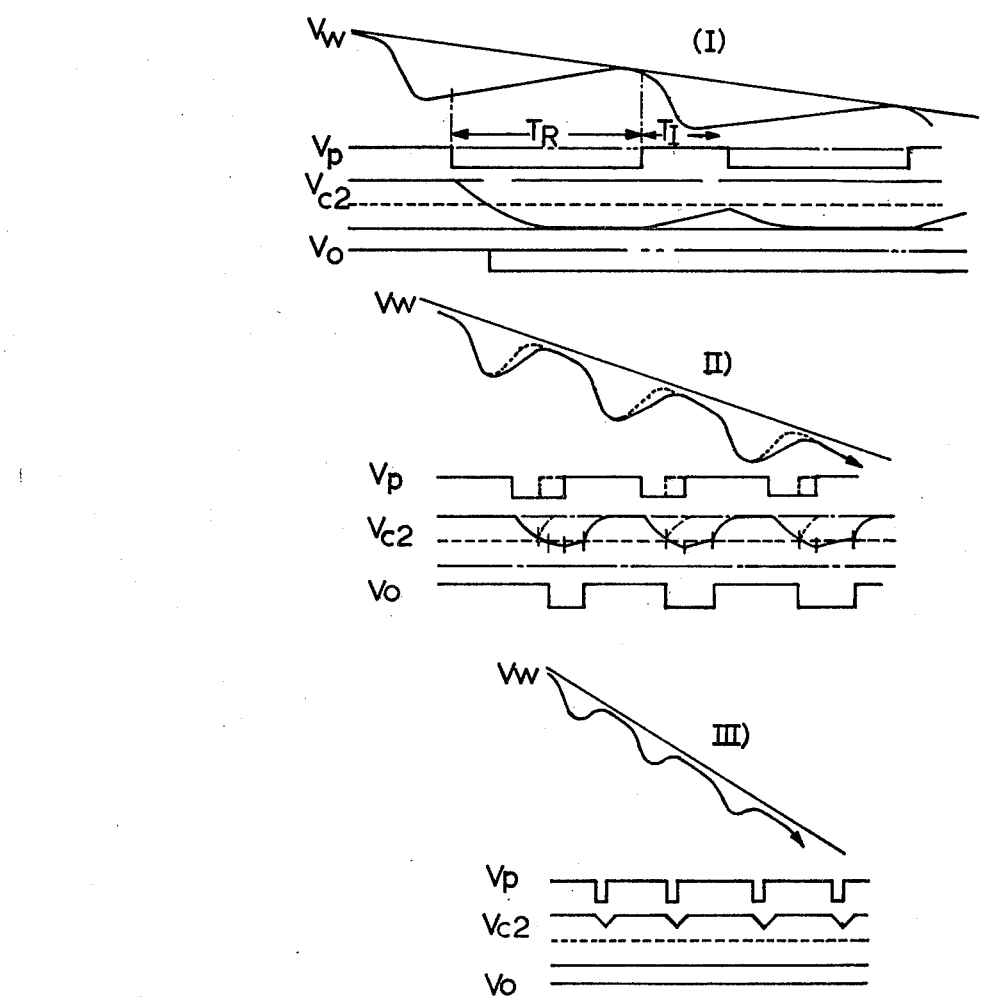
Figure 3:
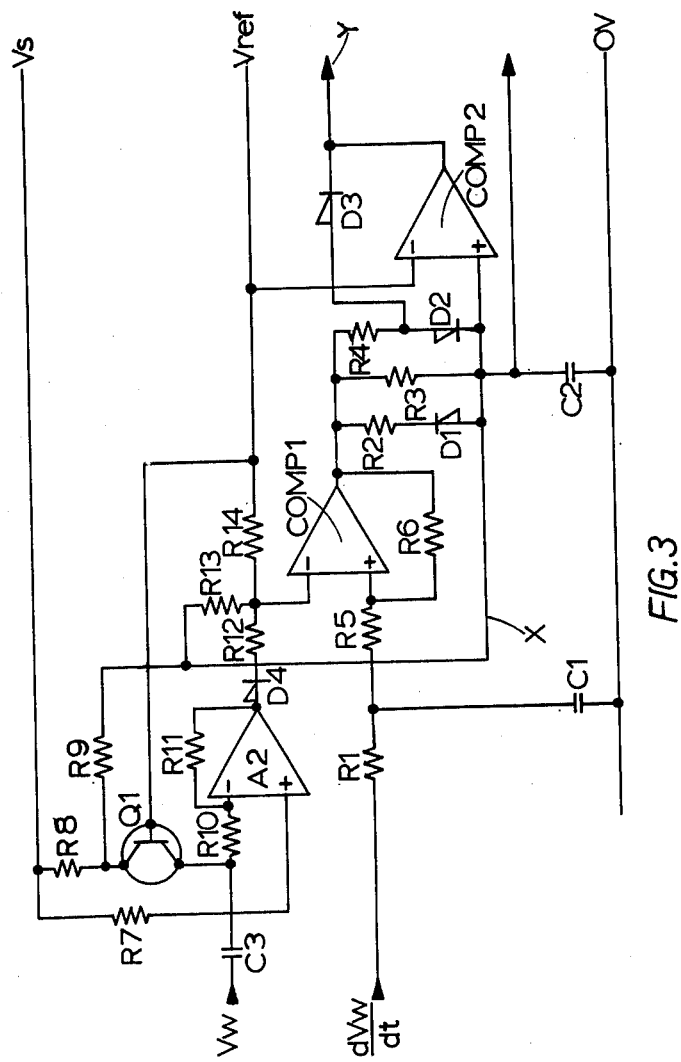
Figure 4:
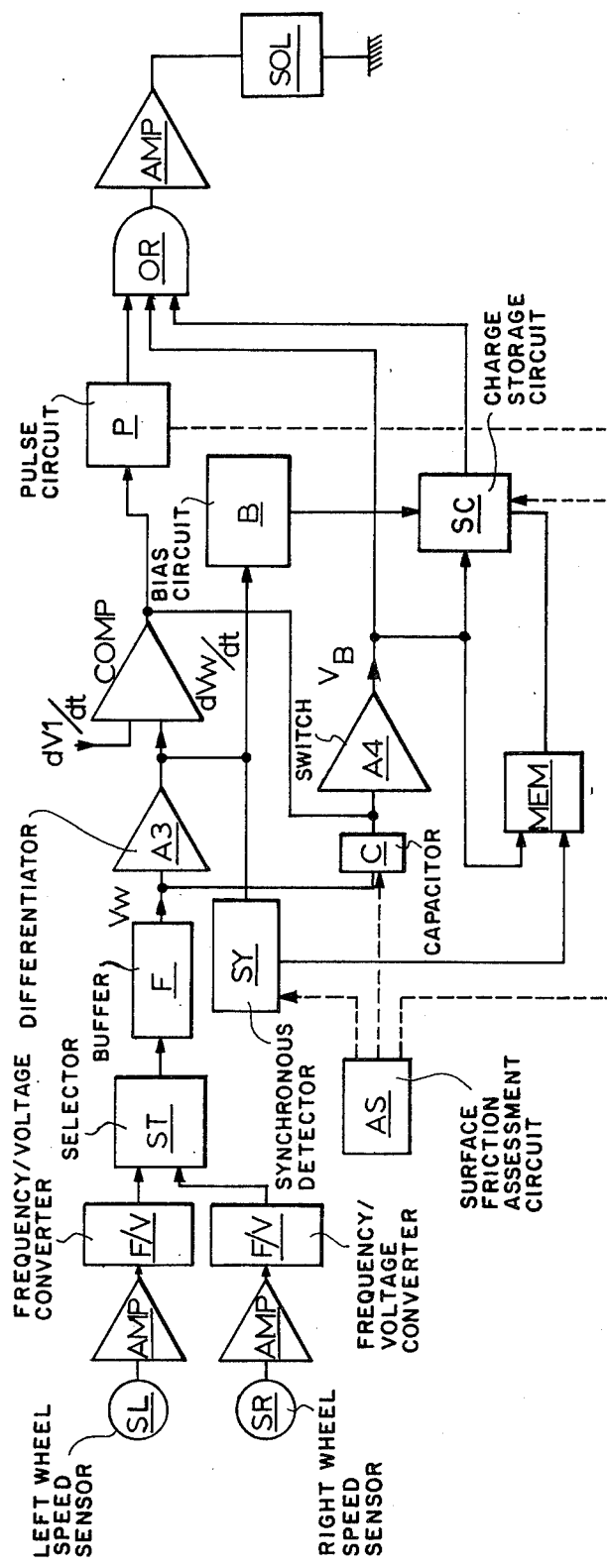

The invention will now be described by way of example with reference to the accompanying drawings in which, FIG. 1 is a circuit diagram of $\mu$ assessment apparatus for use in an anti-skid brake control system according to the invention, FIG. 2 is a diagram showing operational response curves for the apparatus of FIG. 1, FIG. 3 is a circuit diagram showing a modified embodiment of the apparatus in FIG. 1, and FIG. 4 is a schematic diagram of an anti-skid brake control system according to the invention.

Referring to FIG. 1, a wheel speed sensor S is associated with the braked wheel of a vehicle and produces a pulsed signal with a repetition frequency corresponding to the angular speed of the wheel. This pulsed signal is amplified in an amplifier AMP and converted into a corresponding analogue voltage signal $V_w$ by a frequency/voltage converter F/V. The voltage signal $V_w$ is then fed to a differentiator A1 that produces an output signal $dVw/dt$ corresponding to the angular acceleration of the wheel.

The acceleration signal $dVw/dt$ passes via a filter comprising resistor R1 and capacitor C1 to one input of a comparator COMP 1, which compares $dVw/dt$ with a reference voltage $V_{REF}$, corresponding to a predetermined threshold acceleration and produces a negative going output pulse $V_p$ once $V_{REF}$ is exceeded. This comparator COMP 1 continues to produce the output pulse $V_P$ until the wheel acceleration changes to a deceleration, whereupon $V_P$ terminates. Thus, the output pulse $V_P$ defines a wheel acceleration period $T_R$ during which the speed of a wheel is recovering after brake release, and successive pulses $V_P$ in successive deceleration/acceleration cycles define intermediate periods $T_I$ therebetween in which the wheel decelerates. The length of the acceleration periods $T_R$, and the ratio of the acceleration period to the intermediate period $T_R/T_I$ is dependent upon the $\mu$ surface conditions and is used to make an assessment of these conditions as follows.

The output signal $V_P$ from comparator COMP 1 controls charging and discharging of a capacitor C2 via resistors R2, R3 and R4 and diodes D1 and D2. The potential $V_{C2}$ on capacitor $C_2$ forms the $\mu$ assessment signal which is used to effect proportional control as indicated at X in FIG. 1, and which is used to control switching of a second comparator COMP 2 at the threshold $V_{REF}$. The output $V_O$ of COMP 2 is normally high and only goes low once $V_{C2}$ falls below the threshold $V_{REF}$.

Operation of the circuit in FIG. 1 is best understood by reference to the wheel speed curves (i), (ii) and (iii)

shown in FIG. 2 for anti-skid cycling under three different surface $\mu$ conditions of low $\mu$, medium $\mu$ and high $\mu$, respectively. The associated $V_P$ signal, $V_{C2}$ potential and $V_O$ output signal are shown for each wheel speed curve.

Prior to an anti-skid cycling sequence, capacitor C2 is fully charged. However, when a negative pulse $V_P$ is produced, capacitor C2 discharges via the diode D1 and resistor R2 and therefore its potential $V_{C2}$ falls, as shown in all three curves in FIG. 2. Under the high $\mu$ conditions of curve (iii), the negative pulses $V_P$ are short and the potential $V_{C2}$ does not fall below the threshold $V_{REF}$ so comparator COMP 2 continues to produce a high output. Thus, when the negative pulses terminate, the capacitor C2 is charged rapidly back to its fully charged state via resistor R4 and diode D2, and to a lesser extent via resistor R3.

Under the medium $\mu$ conditions of curve (ii), the period $T_R$ of the negative pulses $V_P$ is long enough for the capacitor potential $V_{C2}$ to fall below the threshold $V_{REF}$, whereupon comparator COMP 2 switches and produces a low output pulse $V_O$. This low output pulse $V_O$ inhibits the charge path via R4 and D2, and thus when the negative pulse $V_P$ terminates, capacitor C2 slowly charges via resistor R3 only. However, once the potential $V_{C2}$ rises above threshold $V_{REF}$, comparator COMP 2 resets giving a high output and the capacitor C2 charges rapidly via resistor R4 and diode D2.

Under the low $\mu$ conditions of curve (i), the period $T_R$ of the negative pulses $V_P$ is long and the capacitor C2 is discharged fully by the first pulse $V_P$. The comparator COMP 2 switches to inhibit the charge path via R4 and D2, and the capacitor C2 charges slowly via R3 when the pulse $V_P$ terminates. However, the intermediate period $T_I$ between the negative pulses is too short for the capacitor potential to rise above $V_{REF}$ again so COMP 2 maintains a high output $V_O$ and inhibits rapid charging of capacitor C2.

It will be appreciated from these three examples of different $\mu$ conditions, that the potential $V_{C2}$ gives an indication of surface $\mu$ conditions, and that the output $V_O$ of comparator COMP 2 indicates when surface $\mu$ conditions fall below a preset level. Furthermore, the output $V_O$ is used to maintain an assessment of low $\mu$ conditions by inhibiting recharging of capacitor C2, such action being consistent with the longer intermediate periods $T_I$ to be expected under conditions of improving $\mu$, when rates of brake pressure re-application are slow.

At the start of any anti-skid cycling sequence both the $\mu$ assessment signals $V_{C2}$ and $V_O$ are high, corresponding to an indication of high $\mu$ conditions. However, once cycling starts, $V_{C2}$ changes to give an indication of surface $\mu$ conditions, as already described, and $V_O$ goes low when $\mu$ conditions below a preset level corresponding to $V_{REF}$ are assessed. Typically, if low $\mu$ conditions exist, $V_O$ goes low within $\frac{1}{2}$ second of the beginning of the cycling sequence. Under medium $\mu$ conditions, a low $\mu$ assessment signal $V_O$ may be produced in a similar manner except that this is likely to disappear during the intermediate period before the next skid cycle begins. However, under high $\mu$ conditions, and possibly under medium $\mu$ conditions (see broken lines in (3ii)), a low $\mu$ assessment signal $V_O$ is not produced.

The $\mu$ assessment signal $V_{C2}$ is tapped at X, and the low $\mu$ signal $V_O$ is tapped at Y, and both are used to set parameters in the system so as to improve its effectiveness. The actual parameters adapted depend on the nature of the anti-skid brake control system, but are typically restricted to secondary parameters associated primarily with the brake re-application point. The major parameters such as the initial brake release point and the initial wheel slip requirement are not adjusted so as not to prejudice the operation on the first skid cycle and during subsequent $\mu$ changes during a stop. FIG. 4 indicates some of the parameters that can be adapted in a particular anti-skid brake control system, and is further described hereinbelow. First, however, FIG. 3 shows how the $\mu$ assessment circuit in FIG. 1, can be modified by using the $\mu$ assessment signal $V_{C2}$ to control $V_{REF}$ so that the output pulse $V_P$ is derived more reliably, especially on surfaces where wheel and axle movements create noise in the signal $dV_w/dt$ that can seriously upset low level acceleration measurements.

The $\mu$ assessment signal $V_{C2}$ is applied via connection X and a resistor R13 to the reference input of comparator COMP 1 and serves to lower the threshold $V_{REF}$ as $V_{C2}$ falls so as to induce or prolong a low $\mu$ assessment pulse $V_O$ as lower $\mu$ conditions are assessed.

Also, the signal $V_{C2}$ is used to control the duration of a positive blanking pulse that is applied to the reference input of COMP 1 to hold it in its triggered state, thereby to ensure that it produces the output pulse $V_P$ during wheel speed recovery and is not reset by noise signals.

This blanking pulse is produced by a deceleration sensing switch comprising an operational amplifier A2 with feedback via a resistor R11 and an output connection via a diode D4 and resistor R12 to the reference input of COMP 1. The wheel speed signal $V_w$ is fed via a slip storage capacitor C3 and a resistor R10 to the input of the amplifier A2, thereby to determine a deceleration threshold level above which the amplifier conducts to produce the positive blanking pulse. The charge stored by the capacitor C3, which is in effect a measure of the wheel slip or skid, controls re-setting of the amplifier and termination of the blanking pulse.

Capacitor C3 discharges in response to the change in $V_w$ with wheel speed recovery. Capacitor C3 also discharges through a transistor Q1 which is in turn controlled by the $\mu$ assessment signal $V_{C2}$ via a resistor R9. The discharge current flowing through transistor Q1 is modulated by $V_{C2}$ so that the discharge current increases with improving $\mu$ conditions. Thus, under low $\mu$ conditions, the discharge current is small and therefore a long blanking pulse is produced, but under high $\mu$ conditions, the discharge current is increased and the blanking pulse is correspondingly shorter.

Thus, the deceleration sensing switch A2 senses the commencement of a skid cycle and produces a blanking pulse that changes the threshold on COMP 1 so as to ensure that it is triggered to produce the output pulse $V_P$. The adaptive control of the deceleration sensing switch A2 by the signal $V_{C2}$ adjusts the duration of the blanking pulse so that it is consistent with the expected wheel speed recovery for the assessed $\mu$ conditions. Thus, there is a substantial reduction in the chance of over-blanking under high $\mu$ conditions yet a lengthly blanking period can be maintained under low $\mu$ conditions sufficient to over-ride any noise signals that may be produced during the early stage of wheel speed recovery.

Referring now to FIG. 4 this illustrates an anti-lock brake control system comprising two wheel speed sensors SL and SR, each associated with the left and right hand wheels, respectively, on a vehicle axle so as to produce a pulse signal with a repetition frequency proportional to the angular speed of the wheel. Each pulse signal is amplified in an amplifier AMP and converted into a voltage signal $V_w$ proportional to wheel speed in a frequency/voltage converter F/V. The lower of these wheel speed signals $V_w$ is selected in a selector circuit ST and is fed via a buffer circuit F to a differentiator A3, the buffer circuit F including circuitry that blocks the signal $V_w$ below a minimum acceptable wheel speed. The differentiator A3 acts on the wheel speed signal $V_w$ and produces a deceleration/acceleration signal $dV_w/dt$ that is fed to a comparator COMP in which it is compared with a reference deceleration signal $dV1/dt$ so that the comparator COMP produces an output pulse when the deceleration signal $dVw/dt$ exceeds the deceleration threshold $dV1/dt$. This output pulse triggers a pulse circuit P and causes the latter to produce a brake pressure release pulse that passes via an OR gate and an amplifier AMP and energises a solenoid SOL to release brake pressure. The pulse circuit P limits the length of the brake pressure release pulse and includes an inhibit timing circuit that limits the frequency with which the brake pressure release pulse can be produced.

The differentiator A3 and comparator COMP form a first deceleration sensing switch with a fast response that produces a brake pressure release pulse of limited duration and frequency, these limitations serving to prevent repetitive brake pressure release in response to deceleration signals produced by rough road conditions.

The wheel speed signal $V_w$ is also fed to a second deceleration sensing switch A4 with a slower response than said first deceleration sensing switch, the second switch including a capacitor C through which the wheel speed signal $V_w$ is applied to the switch A4 and which has a control connection from the output of the comparator COMP. The control connection determines the deceleration threshold at which the second switch is triggered and produces a brake pressure release pulse $V_B$ that passes via the OR gate and amplifier AMP to energise the solenoid SOL. The deceleration threshold is $dV2/dt$ when the comparator COMP does not produce an output pulse, this threshold being equal to or greater than said threshold $dV1/dt$ for the first deceleration sensing switch. However, when the comparator COMP produces an output pulse once the threshold $dV1/dt$ is exceeded, this output pulse removes the threshold $dV2/dt$ and allows the second switch A4 to be triggered as soon as a preset fall in wheel speed $\Delta V_w$ occurs.

The capacitor C accumulates a charge dependent on the dip in the wheel speed while the second deceleration switch A4 is triggered. Decay of this charge is restricted by the output pulse from the comparator COMP, but once this pulse has terminated the charge decays at a predetermined rate $dV2/dt$ and in step with the increase in wheel speed until a predetermined charge level is reached at which the switch A4 resets, terminating the brake pressure release pulse $V_B$.

The two deceleration sensing switches thus form a dual channel control system in which the first switch performs a rapid response, brake pressure release action of limited duration and frequency, and the second switch acts as a back-up channel performing a slower response brake pressure release action, the duration of brake pressure release pulses from the second switch being delayed by the first switch removing the deceleration threshold on the second switch via the control connection.

The brake pressure release pulse $V_B$ from the second deceleration sensing switch A4 controls a charge storage circuit SC so that this accumulates charge at a predetermined rate for the duration of the pulse. Once the potential corresponding to the accumulated charge in circuit SC exceeds a predetermined level, circuit SC is capable of producing a brake pressure release pulse that passes via the OR gate and amplifier AMP to energise the solenoid SOL. This pulse may extend beyond that from the second switch A4, thereby acting as an extension release pulse, the length of the pulse depending upon the potential developed in the charge storage circuit SC as compared with a reference potential that varies with wheel acceleration, the reference potential being derived from the differentiator A3 of the first deceleration sensing switch via the bias circuit B. The potential from the circuit SC therefore sets a wheel acceleration requirement that must be met, as judged by comparison with the reference potential, before the extension release pulse is terminated.

In order to prevent very low wheel speed recovery causing over-extension of brake pressure release by the charge storage circuit SC, a synchronous running detector SY is provided that detects a change from wheel acceleration to wheel deceleration and resets circuit SC to terminate brake pressure release. The detector SY comprises a comparator that compares the deceleration/acceleration signal $dVw/dt$ with a bias potential and produces an output signal when $dVw/dt$ exceeds the bias potential, i.e. when wheel acceleration changes to deceleration. This output signal is applied to the reset terminal of a memory unit MEM that has the set terminal connected to the output of the second deceleration switch A4 so that the memory MEM is held set by the brake release pulse $V_B$ and is only reset by the signal from SY if $V_B$ is absent, whereupon circuit SC is reset and brake release terminated.

A $\mu''$ assessment circuit AS, such as illustrated in FIG. 1 or 2, is incorporated in the system of FIG. 4 and operates to control secondary parameters in the system as follows.

The pulse circuit P is controlled so that the width of the brake pressure release pulse that it produces is varied in accordance with $\mu$ conditions, the pulse width being reduced with falling $\mu$ so that it will not remove the slip signal from the slow detection channel.

The pulse circuit P is also controlled so that the limited frequency at which brake pressure release pulses can be produced is reduced with falling $\mu$ conditions. The limited frequency is determined by the length of an inhibit pulse which is made longer on low $\mu$ surfaces where valid cycling will be at a lower frequency due to the slow wheel speed recovery conditions and where too fast a rate of producing fast channel pulses engenders a risk of producing cascade conditions due to reduction of effective signals which would be detected by the slow channel.

The charge storage circuit S is controlled so that the predetermined charge level, above which an extension brake pressure release pulse can be produced, is lowered with falling $\mu$ conditions. The detection of a low $\mu$ surface will therefore signal a reduction in the qualifying charge level in order to ensure the generation of a sufficiently long extension release pulse with the limited slip demanded by high performance operation, thereby to guarantee full recovery under very low μ conditions with unloaded vehicles.

The synchronous running detector SY is controlled so that the bias potential corresponding to the acceleration level above which brake pressure release is terminated, is increased with falling μ conditions. In this manner, the likelihood of erroneous termination of brake pressure release as a result of noise signals can be reduced.

The capacitor C is controlled so that its charge decay rate, otherwise set at dV2/dt, is reduced with falling μ conditions, thereby to increase the length of the brake pressure release pulse under low μ conditions.

We claim:

1. An anti-skid brake control system including sensor means that produces a first signal which is proportional to the acceleration of a braked wheel, switch means that produces a second signal and which responds to said first signal by causing a step change in said second signal at set acceleration levels so as to divide successive skid cycles into successive acceleration periods separated by intermediate periods, means for integrating said second signal so as to produce an output signal which changes in a progressive manner in one sense during each acceleration period and in the opposite sense during each intermediate period so as to vary in accordance with surface friction conditions, and output connection means whereby said output signal is used to vary a control function within the system so that the said control function is set in accordance with said surface friction conditions.

2. A system as claimed in claim 1 in which said integrating means is such as to commence operation by producing an output signal at a predetermined level and to change said output signal in said one sense towards a predetermined threshold level during a first acceleration period, comparison means being provided to compare said output signal with said predetermined threshold level and to produce an output signal indicative of low friction surface conditions while said threshold is exceeded.

3. A system as claimed in claim 2 in which said integrating means is such that the output signal changes in an exponential manner in said one sense so that it approaches a final fixed level.

4. A system as claimed in claim 2 in which said low friction output signal from the comparison means controls the manner in which said output signal changes in said opposite sense so that the rate of change is slower above said threshold than immediately below said threshold.

5. A system as claimed in claim 4 in which said output signal changes exponentially in said opposite sense, an increased rate of change occurring at said threshold level.

6. A system as claimed in claim 2 in which said integrating means comprises a capacitor, the potential of which corresponds to said output signal.

7. A system as claimed in claim 6 in which said capacitor is discharged in said one sense from a predetermined fully charged state.

8. A system as claimed in claim 7 in which the charging rate of said capacitor is increased at said threshold level by said output signal from the comparison means.

9. A system as claimed in claim 1, in which said output signal is used to vary said levels at which said step changes in said second signal are produced so that said level at which said step change is produced at the beginning of each acceleration period is reduced in accordance with said output signal.

10. A system as claimed in claim 1 including blanking means that produces a blanking pulse that holds said switch means in a switched state corresponding to an acceleration period, said blanking means being controlled by the output signal from said integrating means so that the duration of the blanking pulse varies with surface friction conditions, a longer blanking pulse being produced for lower friction conditions.

11. A system as claimed in claim 10 in which said blanking means comprises a capacitor connected in series with the input of a threshold switch to which a signal proportional to wheel speed is applied so that the switch is triggered at a wheel deceleration threshold and produces said blanking pulse whilst triggered, the charge on the capacitor controlling the length of the blanking pulse and the output signal from the integrating means controlling the rate of discharge of said capacitor.

* * * * *